UNITED STATES PATENT OFFICE.

BENJAMIN TALBOT, OF PENCOYD, PENNSYLVANIA.

ART OF MANUFACTURING IRON OR STEEL.

SPECIFICATION forming part of Letters Patent No. 688,557, dated December 10, 1901.

Application filed April 25, 1900. Serial No. 14,337. (No specimens.)

*To all whom it may concern:*

Be it known that I, BENJAMIN TALBOT, residing at Pencoyd, in the county of Montgomery, State of Pennsylvania, have invented an Improvement in the Art of Manufacturing Iron or Steel, of which the following is a specification.

This improvement relates to the inventions described in my United States Letters Patent numbered 599,290, 639,872, and 639,873. It involves a mode of removing carbon very rapidly from liquid iron or steel charged into an open-hearth furnace and producing therefrom a large volume of carbonous-oxid flame for raising the furnace-chamber and the regenerators connected therewith to a high degree of heat, the carbonous-oxid gas evolved burning in the furnace-chamber and the excess or gas unconsumed therein burning in the regenerator.

The principal purpose of this invention is to effect the rapid evolution and burning of carbon from iron or steel in process of treatment and to utilize the large volume of flame produced thereby in creating high temperature, by which a large amount of time is saved in purifying the charge or charges and a greater output of steel is produced in a given time, with economy in fuel and operation. To accomplish the purposes specified, a furnace connected with regenerators—such, for instance, as that shown in Letters Patent of the United States No. 541,402—is preferably preheated and provided with an initial bath of molten iron or steel purified to the desired degree and covered with slag containing metallic oxid capable of removing carbon, such as oxid of iron or manganese, in sufficient proportion to rapidly oxidize the carbon contained in the liquid iron or steel to be treated. The metallic oxid in the slag should preferably be in excess of that required to oxidize the entire carbon contents of the metal to be purified to produce the most satisfactory results. The oxidizing character of the covering of slag is maintained by drawing off portions thereof as the same becomes exhausted and enriching the remainder by additions of mill-cinder, scale, or iron ore and lime or limestone from time to time, as required. The higher and more uniform the proportion of oxid maintained in the slag relative to the carbon contents of the successive charges of molten metal poured therethrough or brought into contact therewith the more rapid and uniform will be the evolution of carbonous-oxid gas and flame, the higher and more uniform the temperatures maintained, and the shorter the time involved in the reduction of the impure charges. The heat evolved in the foregoing operation supplements the effect of the fuel-gases which are employed as in the ordinary practice and has been found to greatly increase the output per unit of plant and to produce a better quality of metal. The operations are preferably carried on continuously by pouring from time to time molten iron or steel containing carbon through a slag covering containing metallic oxid or otherwise into contact and combination therewith, maintaining the slag covering in a state capable of oxidizing the carbon in the metal to be treated by enriching and replacing such slag from time to time as it becomes exhausted and withdrawing from time to time from the bath molten purified or partially-purified metal.

In building up a charge of metal in a fixed open-hearth furnace a small bath of pure metal is formed in any usual manner therein (say twenty to twenty-five per cent. of the furnace capacity) with a covering of oxidizing-slag, and the furnace is then filled by means of repeated small additions of impure metal. An interval of time is allowed between the successive additions of metal during which oxids are added in order to maintain a positive oxidizing-slag, so that the bath may be sufficiently purified before the subsequent addition of metal is made. The lower the bath is in metalloids the quicker will the carbon be removed from the fresh liquid metal addition. When it is desired to retard the removal of carbon, as where it is necessary to remove phosphorus from the liquid bath, solid pig-iron containing carbon with but little phosphorus may be charged into the bath, since it lowers the temperature and is not so rapidly purified as in case the addition is of liquid metal. Slag is removed from time to time when necessary during the building up of the charge or after the furnace is filled. This method of building up the charge is continued until the desired quantity of purified metal is obtained, the furnace being then tapped and the operation described repeated. It will be understood that the metal thus treated may be either iron or steel containing an excess of carbon, by which is meant carbon which should be removed in the process of treatment to produce the final product desired or which may be removed as an agency in the process of treatment. The metal to be treated may be wholly unrefined or partially refined—as the products of the blast-furnace, Bessemer, mixer, reservoir, or other furnace—and may contain in addition to the carbon content silicon, phosphorus, sulfur, or other impurities the removal of which is greatly facilitated by the high heat developed from combining and burning the oxygen of the slag and the carbon of the metal treated. It is not essential that all the carbon of the metal in process of treatment should be exhausted, it being in some instances desirable to retain a portion in the bath and in the metal drawn therefrom—say fifteen one-hundredths of one per cent.—the product being either wholly refined in the furnace or partially refined therein and finished by subsequent treatment. For the most rapid and satisfactory evolution of carbon and purification of metal the liquid-steel bath should, however, be as low as possible in carbon content, down to traces, the evolution of carbon from the added charges being most rapid when the bath is in a substantially purified condition. When the treatment or process involves the addition of but a single charge of impure metal to the bath of molten metal, it is not so essential that the carbon should be within the limit specified or below fifteen one-hundredths of one per cent.

Having thus described my invention, I claim—

1. In the manufacture of iron and steel, the process which consists in forming a bath of purified or partially-purified molten metal and maintaining on the surface of said bath a slag covering containing an oxid capable of removing carbon in greater percentage than is required for oxidizing the carbon contained in the metal brought into contact therewith, and building up and purifying said bath by bringing additional molten metal containing carbon into contact with said oxidizing-slag, thereby rapidly producing large volumes of carbonous-oxid gas, burning said gas so as to produce an intense heat, and utilizing said heat in the purification of said metal, substantially as specified.

2. In the manufacture of iron and steel, the process which consists in forming a bath of molten metal containing less than fifteen one-hundredths of one per cent. of carbon, and maintaining on the surface of said bath a slag covering containing an oxid capable of removing carbon in greater percentage than is required for oxidizing the carbon contained in the metal brought into contact therewith, and building up and purifying said bath by bringing additional molten metal containing carbon into contact with said oxidizing-slag, thereby rapidly producing large volumes of carbonous-oxid gas, burning said gas so as to produce an intense heat, and utilizing said heat in the purification of said metal, substantially as specified.

3. In the manufacture of iron and steel, the process which consists in providing a bath of purified or partially-purified molten metal, providing said bath with a slag covering containing an oxid capable of removing carbon in greater percentage than is required for oxidizing the carbon of the metal brought into contact therewith, bringing into contact with said slag from time to time additions of molten metal containing carbon, withdrawing molten metal from said bath from time to time, withdrawing exhausted slag from said covering from time to time, and adding fresh oxids to said slag covering from time to time so as to maintain therein a greater percentage of oxid than is required for oxidizing the carbon contained in the metal brought into contact therewith, substantially as specified and for the purpose set forth.

In testimony whereof I have hereunto set my hand, in the presence of the subscribing witnesses, this 24th day of April, 1900.

BENJAMIN TALBOT.

Witnesses:
JOHN THIEL,
CHARLES N. BUTLER.